US010362314B2

(12) United States Patent
Lin et al.

(10) Patent No.: US 10,362,314 B2
(45) Date of Patent: Jul. 23, 2019

(54) APPARATUS AND METHOD FOR VIDEO CODING BY INTRA-PREDICTION

(71) Applicant: MEDIATEK INC., Hsinchu (TW)

(72) Inventors: Jian-Liang Lin, Yilan County (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 219 days.

(21) Appl. No.: 15/355,484

(22) Filed: Nov. 18, 2016

(65) Prior Publication Data

US 2017/0155911 A1    Jun. 1, 2017

Related U.S. Application Data

(60) Provisional application No. 62/260,353, filed on Nov. 27, 2015.

(51) Int. Cl.
*H04N 19/159*    (2014.01)
*H04N 19/46*    (2014.01)
(Continued)

(52) U.S. Cl.
CPC .......... *H04N 19/159* (2014.11); *H04N 19/11* (2014.11); *H04N 19/117* (2014.11); *H04N 19/147* (2014.11); *H04N 19/46* (2014.11); *H04N 19/82* (2014.11); *H04N 19/172* (2014.11); *H04N 19/174* (2014.11); *H04N 19/176* (2014.11)

(58) Field of Classification Search
None
See application file for complete search history.

(56) References Cited

U.S. PATENT DOCUMENTS

2008/0232452 A1* 9/2008 Sullivan ............. H03H 17/0294
                                                          375/232
2011/0038415 A1* 2/2011 Min ..................... H04N 19/115
                                                          375/240.12

(Continued)

FOREIGN PATENT DOCUMENTS

CN           102939761 A       2/2013

OTHER PUBLICATIONS

International Search Report and the Written Opinion of the International Searching Authority dated Feb. 16, 2017, issued in International Application No. PCT/CN2016/107252.

*Primary Examiner* — Anand S Rao
*Assistant Examiner* — Tyler B Edwards
(74) *Attorney, Agent, or Firm* — Oblon, McClelland, Maier & Neustadt, L.L.P.

(57) ABSTRACT

Aspects of the disclosure include a method for video coding. The method includes receiving input data associated with a current block in a current image frame of video data, where the current block is coded by intra-prediction or to be coded by intra-prediction. The method also includes determining an intra-prediction mode of the current block, selecting one of a plurality of filters including at least a default filter and an N-tap filter, and generating filtered neighboring samples by filtering neighboring samples adjacent to the current block using the selected filter, where N is a positive integer different from 3. Moreover, the method includes encoding or decoding the current block by predicting the current block based on the filtered neighboring samples and the intra-prediction mode.

21 Claims, 6 Drawing Sheets

(51) Int. Cl.
*H04N 19/117*  (2014.01)
*H04N 19/147*  (2014.01)
*H04N 19/11*   (2014.01)
*H04N 19/82*   (2014.01)
H04N 19/172   (2014.01)
H04N 19/174   (2014.01)
H04N 19/176   (2014.01)

(56) References Cited

U.S. PATENT DOCUMENTS

| | | | |
|---|---|---|---|
| 2012/0294357 A1* | 11/2012 | Lainema | H04N 19/159 |
| | | | 375/240.12 |
| 2012/0314771 A1* | 12/2012 | Lim | H04N 19/117 |
| | | | 375/240.16 |
| 2015/0195526 A1 | 7/2015 | Zhu et al. | |

* cited by examiner

APPARATUS AND METHOD FOR VIDEO CODING BY INTRA-PREDICTION

INCORPORATION BY REFERENCE

This present disclosure claims the benefit of U.S. Provisional Application No. 62/260,353, "Methods of Adaptive Neighboring Samples Filtering for Intra Prediction" filed on Nov. 27, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards include dividing an image frame of an input video into one or more coding units. In general, a coding unit may include a prediction unit that has a luma prediction block and at least two corresponding chroma prediction blocks. When encoding an original image of a block, the original image can be divided into a predicted image and a residual image of the block according to a predetermined video coding standard. When decoding the block, a reconstructed image of the block can be obtained by generating and combining the predicted image and the residual image of the block according to the same predetermined video coding standard.

In some applications, the predicted image of a block can be generated based on the image(s) of other blocks and/or other frames. Such prediction scheme is also known as inter-prediction. In some applications, the predicted image of a block can be generated by extrapolating neighboring samples adjacent to the block based on a selected one of plural prediction modes. Such prediction scheme is also known as intra-prediction. The plural prediction modes for intra-prediction may include extending the neighboring samples along one of plural predetermined direction (also known as directional prediction modes), assigning an average value of the neighboring samples to all pixels of the block (also known as a direct current (DC) prediction mode), or performing a two-dimensional extrapolation based on the neighboring samples adjacent to different sides of the block (also known as a planar prediction mode).

SUMMARY

Aspects of the disclosure provide a method for video coding. The method can include receiving input data associated with a current block in a current image frame of video data, where the current block is coded by intra-prediction or to be coded by intra-prediction. The method can also include determining an intra-prediction mode of the current block, selecting one of a plurality of filters including at least a default filter and an N-tap filter, and generating filtered neighboring samples by filtering neighboring samples adjacent to the current block using the selected filter, where N is a positive integer different from 3. Moreover, the method may include encoding or decoding the current block by predicting the current block based on the filtered neighboring samples and the intra-prediction mode.

In an embodiment, the method further includes transmitting or deriving a flag that indicates whether the selected filter is the default filter or the N-tap filter.

The method may further include determining whether to perform a filtering process on the neighboring samples based on at least one of the intra-prediction mode and a block size associated with the current block, transmitting or deriving the flag only when determined to perform the filtering process on the neighboring samples, and, when determined not to perform the filtering process on the neighboring samples, encoding or decoding the current block by predicting the current block based on the neighboring samples and the intra-prediction mode.

The method may further include determining whether to transmit or derive the flag based on at least one of the intra-prediction mode and a block size associated with the current block, and, when determined not to transmit or derive the flag, selecting the default filter as the selected filter. In an embodiment, the block size associated with the current block comprises one or a combination of a width of the current block, a height of the current block, a quadtree depth associated with the current block, a coding unit split depth associated with the current block, and a quadtree-binary tree split depth associated with the current block. The method may further include transmitting or deriving the flag only when the block size is greater than a first predefined threshold.

In an embodiment, the method also includes determining whether to transmit or derive the flag based on residual coding of the current block, and, when determined not to transmit or derive the flag, selecting the default filter as the selected filter.

Additionally, the flag may be transmitted or derived only when at least one non-zero coefficient associated with the current block. The flag may be transmitted or derived only when a number of non-zero coefficients associated with the current block is greater than a second predefined threshold. The flag may be transmitted or derived only when a statistic value of magnitudes of non-zero coefficients associated with the current block is greater than a third predefined threshold.

In an embodiment, the flag is transmitted at a sequence, view, picture, slice, or block level of a video stream that carries the video data.

Aspects of the disclosure further provide a video coding apparatus that includes a processing circuit configured to receive input data associated with a current block in a current picture of video data, where the current block is coded by intra-prediction or to be coded by intra-prediction. The processing circuit is also configured to determine an intra-prediction mode of the current block, select one of a plurality of filters including at least a default filter and an N-tap filter, and generate filtered neighboring samples by filtering neighboring samples adjacent to the current block using the selected filter, where N is a positive integer different from 3. Moreover, the processing circuit is configured to encode or decode the current block by predicting the current block based on the filtered neighboring samples and the intra-prediction mode.

In an embodiment, the processing circuit is further configured to transmit or derive a flag that indicates whether the selected filter is the default filter or the N-tap filter. The processing circuit may be further configured to determine whether to perform a filtering process on the neighboring samples based on at least one of the intra-prediction mode and a block size associated with the current block, transmit or derive the flag only when determined to perform the filtering process on the neighboring samples, and, when determined not to perform the filtering process on the neighboring samples, encode or decode the current block by predicting the current block based on the neighboring samples and the intra-prediction mode.

Aspects of the disclosure further provide a non-transitory computer readable medium storing program instructions for causing a processing circuit of an apparatus to perform a video coding method. The method may include receiving input data associated with a current block in a current image frame of video data, where the current block is coded by intra-prediction or to be coded by intra-prediction. The method also includes determining an intra-prediction mode of the current block, selecting one of a plurality of filters including at least a default filter and an N-tap filter, and generating filtered neighboring samples by filtering neighboring samples adjacent to the current block using the selected filter, where N is a positive integer different from 3. Moreover, the method includes encoding or decoding the current block by predicting the current block based on the filtered neighboring samples and the intra-prediction mode.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In accordance with some embodiments of the present disclosure, when encoding or decoding a block using an intra-prediction scheme, the neighboring samples adjacent to the block may be bypassed, filtered by a default filter, or filtered by an N-tap filter where N is greater than 3. Accordingly, at the encoding end, the block may be encoded with the properly processed neighboring samples that would provide the optimal coding result, such as minimal coding cost, maximal image quality, a predetermined balance between the coding cost and the image quality, or the like. Similarly, at the decoding end, the block may be decoded using the properly processed neighboring samples as prescribed at the encoding end, either through an explicit flag or derived as an implicit flag.

Figure 1:
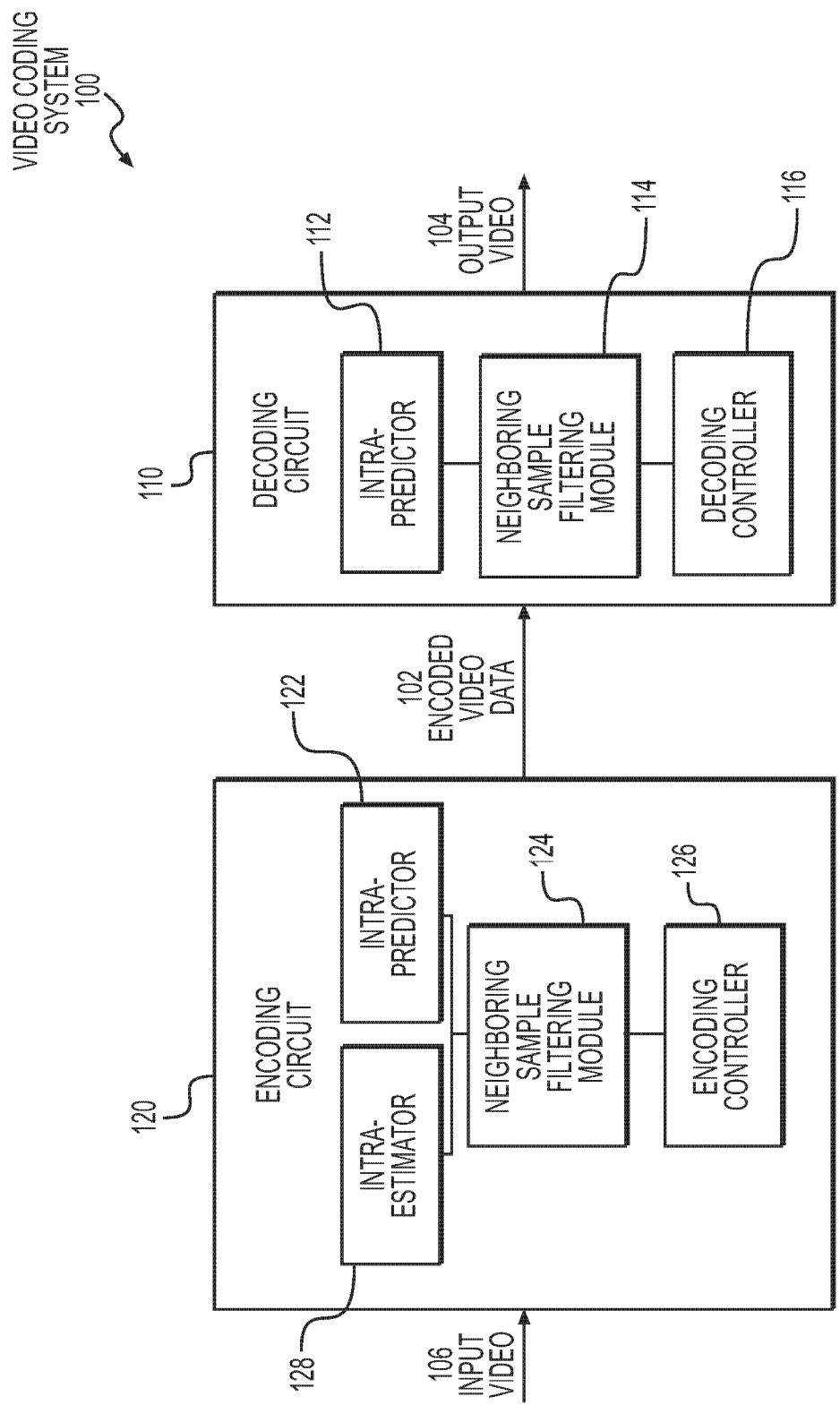
FIG. 1 shows a functional block diagram of a video coding system according to an embodiment of the disclosure.

FIG. 1 shows a functional block diagram of a video coding system 100 according to an embodiment of the disclosure. The video coding system 100 includes a decoding circuit 110 and an encoding circuit 120. The encoding circuit 120 receives input video 106 and generates encoded video data 102 by encoding input video 106. The decoding circuit 110 receives the encoded video data 102 and generates output video 104 by decoding the encoded video data 102. The video coding system 100 may be implemented by one or two video coding devices. For example, a video coding device according to the present disclosure may include the decoding circuit 110, the encoding circuit 120, or both of the decoding circuit 110 and encoding circuit 120.

The decoding circuit 110 can include an intra-predictor 112, a neighboring sample filtering module 114, and a decoding controller 116. The intra-predictor 112 can generate a predicted image of a block to be decoded (or a current block) based on processed neighboring samples from the neighboring sample filtering module 114 and a corresponding intra-prediction mode that is dictated by the encoded video data 102. The decoding controller 116 can oversee the decoding process of the encoded video data 102, including selecting one of plural filters of the neighboring sample filtering module 114 or a bypass path of the neighboring sample filtering module 114 for processing neighboring samples that are adjacent to the current block.

The decoding controller 116 can determine whether to perform a filtering process on the neighboring samples at all based on the intra-prediction mode and/or a block size associated with the current block. When the decoding controller 116 determines that the neighboring samples are to be filtered by a filter of the neighboring sample filtering module 114, the decoding controller 116 may further derive a flag that indicates which filter to use based on the intra-prediction mode, a block size associated with the current block, or information provided in the encoded video data 102. In one example, the decoding controller 116 can select a default filter of the neighboring sample filtering module 114 when no indication of which filter to use is provided. The block size associated with the current block may correspond to one or a combination of a width of the current block, a height of the current block, a quadtree depth associated with the current block, a coding unit split depth associated with the current block, a quadtree-binary tree split depth associated with the current block, or the like.

The intra-predictor 112 can support plural intra-prediction modes, and each one of the intra-prediction modes dictate a unique extrapolation approach for generating a predicted image based on the processed neighboring samples from the neighboring sample filtering module 114. For example, when the decoding circuit 110 is used to decode a 4×4 luma block based on the International Telecommunication Union Telecommunication Standardization Sector (ITU-T) H.264 standard (also known as H.264, MPEG-4 Part 10, Advanced Video Coding, MPEG-4 AVC, or H.264/MPEG-4 AVC standard), the intra-predictor 112 may perform 9 different intra-prediction modes consistent with the H.264 standard, including 8 different directional prediction modes and a DC prediction mode. When the decoding circuit 110 is used to decode a 32×32 luma block based on the ITU-T H.265 standard (also known as H.265, High Efficiency Video Coding, HEVC, or H.265/HEVC standard), the intra-predictor 112 may perform 35 different intra-prediction modes consistent with the H.265 standard, including 33 different directional prediction modes, a DC prediction mode, and a planar prediction mode.

In some examples, the decoding controller 116 extracts information regarding the corresponding intra-prediction mode for the block coded by intra-prediction from the encoded video data 102.

The encoding circuit 120 includes at least an intra-predictor 122, an intra-estimator 128, a neighboring sample filtering module 124, and encoding controller 126. The intra-estimator 128 can analyze the input video 106 and select an intra-prediction mode based on the processed neighboring samples from the neighboring sample filtering module 124. The intra-prediction mode determined by the intra-estimator 128 may be further encoded as part of the encoded video data 102. The intra-predictor 122 can generate a predicted image of the block based on the processed neighboring samples from the neighboring sample filtering module 124 and the determined intra-prediction mode from the intra-estimator 128 for further encoding process. The encoding controller 126 can oversee the encoding process of a current block, including selecting one of plural filters of the neighboring sample filtering module 124 or a bypass path of the neighboring sample filtering module 124 for processing neighboring samples that are adjacent to the block to be encoded.

The encoding controller 126 can determine whether to select a filter for performing a filtering process on the neighboring samples based on the intra-prediction mode and/or a block size associated with the current block. When the encoding controller 126 determines to use a filter of the neighboring sample filtering module 124 to process the current block, the selection of the filter can be made according to the intra-prediction mode, a block size associated with the current block, or the residual coding of the current block (such as a number of non-zero coefficients associated with the current block or a statistic value of magnitudes of non-zero coefficients associated with the current block). When the encoding controller 126 determines to use a filter of the neighboring sample filtering module 124 to perform a filtering process on the neighboring samples, the encoding controller 126 may generate a flag identifying the selected filter and transmit the flag by embedding the flag or information from which the flag may be derived in the encoded video data 102. In at least one example, when it is determined that a default filter of the neighboring sample filtering module 124 is to be used for performing the filtering process, the encoding controller 126 may avoid transmitting the flag through the encoded video data 102 as an implicit indication of selecting the default filter.

The intra-estimator 128 and the intra-predictor 122, like the intra-predictor 112, can support plural intra-prediction modes, and each one of the intra-prediction modes dictate a unique approach for generating a predicted image based on the processed neighboring samples from the neighboring sample filtering module 124. When the encoding circuit 120 is used to encode a 4×4 luma block based on the H.264 standard, the intra-estimator 128 and the intra-predictor 122 may select and perform 9 different intra-prediction modes consistent with the H.264 standard as discussed above. When the encoding circuit 120 is used to decode a 32×32 luma block based on the H.265 standard, the intra-estimator 128 and the intra-predictor 122 may select and perform 35 different intra-prediction modes consistent with the H.265 standard as discussed above.

The plural filters of the neighboring sample filtering module 114 or 124 include at least a default filter and one or more N-tap filters, where N is a positive integer greater than three. The default filter and one or more N-tap filters may be different low-pass filters that can smoothen the changes of the neighboring samples along the sides of the current block. Each neighboring sample may correspond to a pixel or a group of pixel immediately adjacent a side or a corner of the current block.

The default filter may be a 3-tap filter with filter coefficients [1, 2, 1]/4 such that a filtered sample S'[n] of a neighboring sample S[n] of a block may be filtered based on three consecutive neighboring samples S[n−1], S[n], and S[n+1] of the block according to the following equation:

$$S'[n]=(S[n-1]+2 \cdot S[n]+S[n+1])/4.$$

The N-tap filters may include a 5-tap filter with filter coefficients [2, 3, 6, 3, 2]/16 such that a filtered sample S'[n] of a neighboring sample S[n] of a block may be filtered based on five consecutive neighboring sample S[n−2], S[n−1], S[n], S[n+1], and S[n+2] of the block according to the following equation:

$$S'[n]=(2 \cdot S[n-2]+3 \cdot S[n-1]+6 \cdot S[n]+3 \cdot S[n+1]+2 \cdot S[n+2])/16.$$

Other N value and/or filter coefficients are within the contemplated embodiments. The default filter and one or more N-tap filters may also include other types of filters. In many examples, in order to ensure that the decoding circuit 110 can proper decode the encoded video data 102 encoded by the encoding circuit 120, the neighboring sample filtering module 114 or 124 are configured to have the same combination of available filters with compatible filter characteristics. Also, in many examples, the selection of the bypass path or filters at the neighboring samples filtering module 114 at the decoding end and the selection of the bypass path or filters at the neighboring samples filtering module 124 at the encoding end are to be consistent with each other. The selection of the bypass path or filters may be communicated by a flag explicitly provided in the encoded video data 102 (i.e., an explicit flag) or by predetermined selection rules based on the intra-prediction mode and/or a block size associated with the current block (i.e., an implicit flag).

Figure 2:
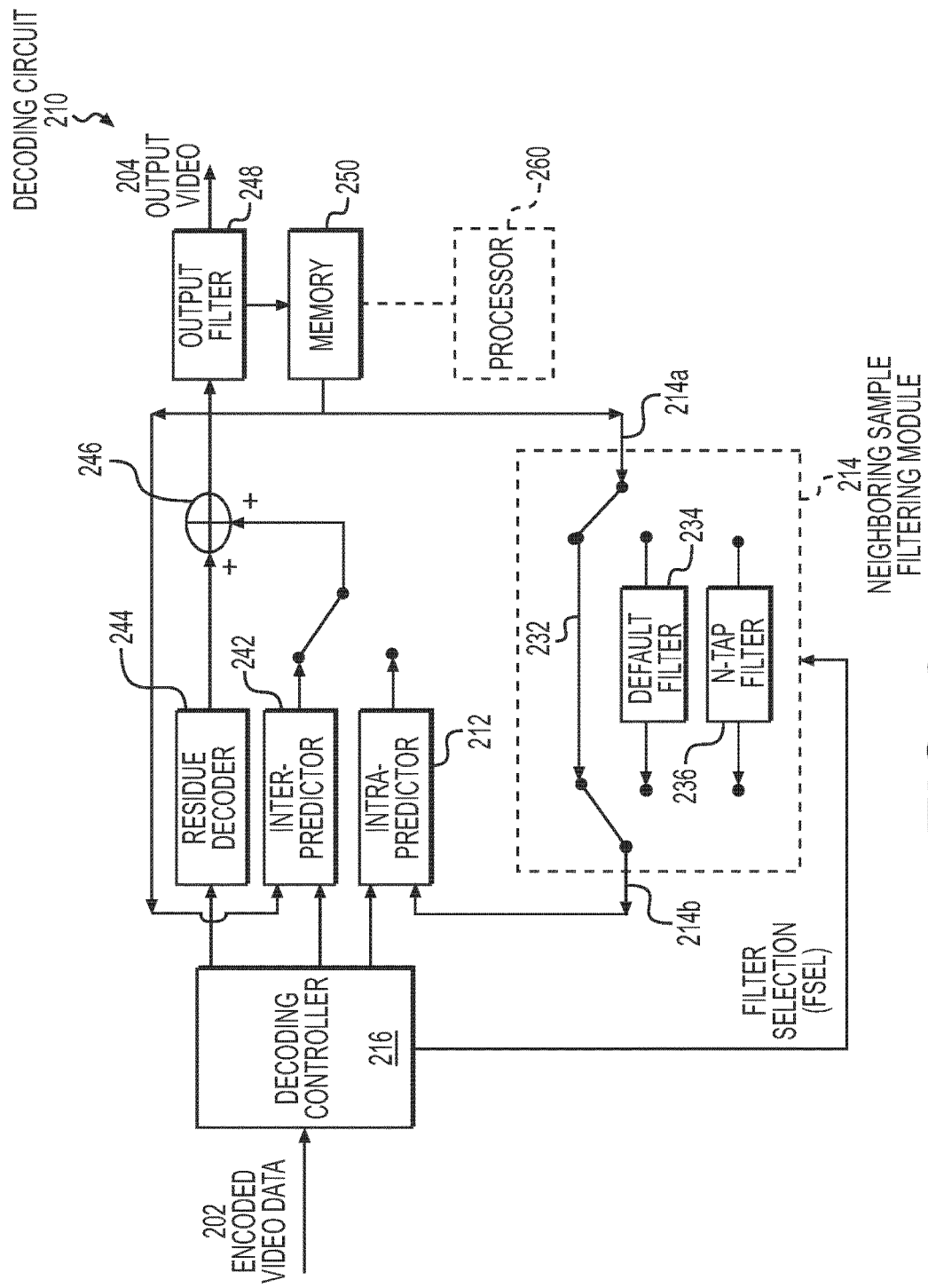
FIG. 2 shows a functional block diagram of a decoding circuit in the video coding system in FIG. 1 according to an embodiment of the disclosure.

FIG. 2 shows a functional block diagram of a decoding circuit 210 in a video coding system, such as the video coding system 100 in FIG. 1, according to an embodiment of the disclosure. Of course, FIG. 2 is a simplified illustration of the decoding circuit 210 and thus may not show all the details and variations of the decoding circuit 210.

The decoding circuit 210 includes an intra-predictor 212, a neighboring sample filtering module 214, and a decoding controller 216. The neighboring sample filtering module 214 includes at least a bypass path 232, a default filter 234, and an N-tap filter 236 that can be selectively coupled between an input terminal 214a and an output terminal 214b of the neighboring sample filtering module 214. The decoding circuit 210 also includes an inter-predictor 242, a residue decoder 244, an adder 246, an output filter 248, a memory 250, and a processor 260. The adder 246 may receive the output from the residue decoder 244 and selectively receive the output from the inter-predictor 242 or the intra-predictor 212. The output filter 248 receives the output from the adder 246 and generates output video 204.

The decoding controller 216 receives and analyzes the encoded video data 202 and extracts residue information and prediction information of a current block. The decoding controller 216 directs the residue information to the residue decoder 244 and directs the prediction information to the intra-predictor 212 or the inter-predictor 242 in order to reconstruct the image of current block according to the prediction method and decoding parameters indicated in the encoded video data 202.

The predicted image from the intra-predictor 212 or the inter-predator 242 is output to the adder 246 to be combined with the corresponding residue image from the residue decoder 244 in order to generate a reconstructed image for the block. The reconstructed images from the adder 246 can be collected by the output filter 248 and temporary stored in the memory 250, which can be used to provide neighboring samples to the neighboring sample filtering module 214. The decoding controller 216 may control the output filter to combine various reconstructed images of various blocks of a frame into a frame image, perform a de-blocking filtering process and/or other in-loop filtering process on the frame image, and output frame images in an order and update rate as indicated in the encoded video data 202 to become the output video 204. The filtered frame images can also be stored in the memory 250, which can be further used by the inter-predictor 242 as reference images.

In operation, when a block of a frame is to be decoded by intra-prediction, the decoding controller 216 forwards the prediction information of the current block that indicates at least an intra-prediction mode and a block size to the intra-predictor 212. The decoding controller 216 also forwards the corresponding residue information to the residue decoder 244. Furthermore, the decoding controller 216 analyzes whether the neighboring sample filtering module 214 is to be set to the bypass path 232, the default filter 234, or the N-tap filter 236, and configures the neighboring sample filtering module 214 accordingly via a filter selection signal (FSEL).

The decoding controller 216 may first determine whether to use a filter to process the neighboring samples at all. If the decoding controller 216 determines not to use any filter, the neighboring sample filtering module 214 may be set to couple the input terminal 214a and the output terminal 214b by the bypass path 232. Whether to select a filter at all may be determined based on the intra-prediction mode and/or the block size associated with the current block. For example, if the intra-prediction mode is the DC mode or the block size is 4×4 pixels, the neighboring samples may be bypassed to the intra-predictor 212 without filtering. In some examples, if the intra-prediction mode is a directional intra-prediction mode that is a vertical or horizontal directional mode or is within a predetermined variation from the vertical or horizontal directional mode, the neighboring samples may also be bypassed to the intra-predictor 212 without filtering. In some examples, decoding controller 216 determines whether to use a filter based on a flag or an explicit indication embedded in the encoded video data 202.

When it is determined that the neighboring samples are to be processed by a filter of the neighboring sample filtering module 214, the decoding controller 216 may further determine which filter of the neighboring sample filtering module 214 to be selected. The determination with respect to selecting a filter may be performed based on the intra-prediction mode, the block size, or the residue information associated with the current block (i.e., the residual coding of the current block). For example, the decoding controller 216 may determine which filter to use based on a number of non-zero coefficients associated with the current block. In some examples, if the number of non-zero coefficients is non-zero (e.g., greater than zero), the N-tap filter 236 may be selected to filter the neighboring samples. In some examples, if the number of non-zero coefficients is greater than a predetermined number that is greater than zero, the N-tap filter 236 may be selected to filter the neighboring samples. Otherwise, the default filter 232 may be selected. In some examples, decoding controller 216 selects the filter based on a flag or an explicit indication embedded in the encoded video data 202. The decoding controller 216 may select the filter based on presence or absence of a flag embedded in the encoded video data 202. For example, the decoding controller 216 may select the default filter 234 when the encoded video data 202 do not include the flag that indicates the selection of the filter for filtering neighboring samples.

Moreover, as shown in FIG. 2, the processor 260 is electrically coupled with the memory 250 and can be configured to execute program instructions stored in the memory 250 to perform various functions. The processor 260 can include a single or multiple processing cores. Various components of the decoding circuit 210, such as the decoding controller 216, intra-predictor 212, inter-predictor 242, residue decoder 244, adder 246, neighboring sample filtering module 214, and/or output filter 248, may be implemented by hardware components, the processor 260 executing the program instructions, or a combination thereof. Of course, the processor 260 can also execute program instructions to control receiving of the encoded video data 202 and the output or display of the output video 248. In some examples, the processor 260 can execute program instructions to perform functions that may not be directly related to decoding the encoded video data 202.

The memory 250 can be used to store the program instructions, information corresponding to predetermined prediction modes, reconstructed images of various blocks, and/or intermediate data. In some examples, the memory 250 includes a non-transitory computer readable medium, such as a semiconductor or solid-state memory, a random access memory (RAM), a read-only memory (ROM), a hard disk, an optical disk, or other suitable storage medium. In some embodiments, the memory 250 includes a combination of two or more of the non-transitory computer readable mediums listed above.

Figure 3:
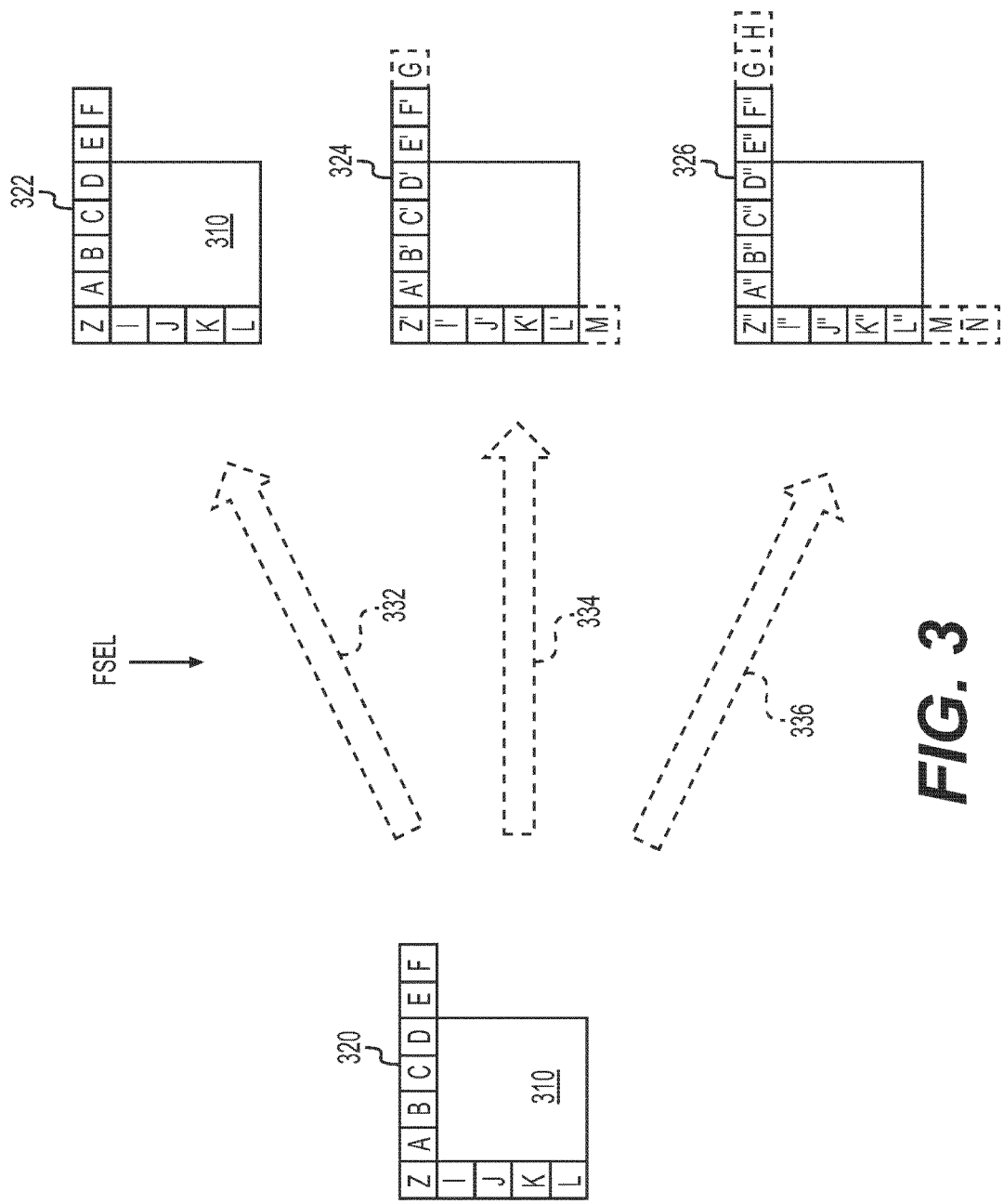
FIG. 3 shows a diagram illustrating processing neighboring samples under various scenarios according to an embodiment of the disclosure.

FIG. 3 shows a diagram illustrating processing neighboring samples 320 adjacent to a block 310 under various scenarios according to an embodiment of the disclosure. As shown in FIG. 3, the block 310 has 4×4 pixels, which is illustrated as a non-limiting example. The neighboring samples 320 has 6 samples A, B, C, D, E, and F adjacent to the upper side of the block 310, 4 samples I, J, K, and L adjacent to the left side of the block 310, and a corner sample Z between samples A and I and adjacent to an upper-left corner of the block 310. Each sample of the neighboring samples 320 may corresponds to a corresponding neighboring pixel adjacent to the block.

Furthermore, process 332 indicates that, in accordance with the filter selection signal (FSEL), the bypass path (such as the bypass path 232 in FIG. 2) is selected for processing the neighboring samples 320. The processed neighboring samples 322 would be identical as the neighboring samples 320.

Process 334 indicates that the default filter (such as the default filter 234 in FIG. 2) is elected according to the filter selection signal (FSEL) for processing the neighboring samples 320. In some examples, the default filter 234 is a 3-tap filter with filter coefficients [1, 2, 1]/4. The processed neighboring samples 324 may include processed neighboring samples A', B', C', D', E', F', I', J', K', L', and Z' to be output in replace of original neighboring samples A, B, C, D, E, F, I, J, K, L, and Z, respectively. When the default filter 234 is a 3-tap filter, additional reference samples G and M are introduced for calculating the processed neighboring samples F' and L'. For example, the processed neighboring samples may be implemented according to the following equations:

$Z'=(I+2Z+A+2)>>2,$ $A'=(Z+2A+B+2)>>2,$ $B'=(A+2B+C+2)>>2,$ $C'=(B+2C+D+2)>>2,$ $D'=(C+2D+E+2)>>2,$ $E'=(D+2E+F+2)>>2,$ $F'=(E+2F+G+2)>>2,$ $I'=(J+2I+Z+2)>>2,$ $J'=(K+2J+I+2)>>2,$ $K'=(L+2K+J+2)>>2,$ and $L'=(M+2K+K+2)>>2.$ The reference sample G or the reference sample M may correspond to actual pixels in an original image of a frame where the current block resides or available pixels in the decoded portion of the frame. Also, the reference sample G or the reference sample M may be extrapolated from actual or available pixels of the frame. In some examples, the reference sample G may be a duplication of the adjacent available sample, such as sample F, a weighted average of available pixels, or any given value. Similarly, the reference sample M may be a duplication of the adjacent available sample, such as sample L, a weighted average of available pixels, or any given value. For example, for a frame image having 8-bit pixels, the reference sample G or M can be set to 128.

Moreover, process 336 indicates that the N-tap filter (such as the N-tap filter 236 in FIG. 2) is selected according to the filter selection signal (FSEL) for processing the neighboring samples 320. In some examples, the N-tap filter 236 is a 5-tap filter with filter coefficients [2, 3, 6, 3, 2]/16. Therefore, the processed neighboring samples 326 may include processed neighboring samples A", B", C", D", E", F", I", J", K", L", and Z" to be output in replace of original neighboring samples A, B, C, D, E, F, I, J, K, L, and Z, respectively. When the N-tap filter 236 is a 5-tap filter, additional reference samples G, H, M, and N are introduced for calculating the processed neighboring samples E", F", K", and L". For example, the processed neighboring samples may be implemented according to the following equations:

$Z''=(2J+3I+6Z+3A+2B+8)>>4,$ $A''=(2I+3Z+6A+3B+2C+8)>>4,$ $B''=(2Z+3A+6B+3C+2D+8)>>4,$ $C''=(2A+3B+6C+3D+2E+8)>>4,$ $D''=(2B+3C+6D+3E+2F+8)>>4,$ $E''=(2C+3D+6E+3F+2G+8)>>4,$ $F''=(2D+3E+6F+3G+2H+8)>>4,$ $I''=(2K+3J+6I+3Z+2A+8)>>4,$ $J''=(2L+3K+6J+3I+2Z+8)>>4,$ $K''=(2M+3L+6K+3J+2I+8)>>4,$ and $L''=(2N+3M+6L+3K+2J+8)>>4.$ Similar to the example for generating the processed neighboring samples 324, each of the reference samples G, H, M, and N may be an available pixel from the original image of the frame or the decoded portion of the frame. Each of the reference samples G, H, M, and N may be extrapolated from available pixels from the original image of the frame or the decoded portion of the frame. In some examples, the reference samples G and H may be duplications of the adjacent available sample(s), such as sample F, a weighted average of known pixels, or any given value. Similarly, the reference samples M and N may be duplications of the adjacent available sample(s), such as sample L, a weighted average of known pixels, or any given value. For example, for a frame image having 8-bit pixels, the reference sample G, H, M, and N can be set to 128.

Of course, the block 310, the neighboring samples 320, and the processed neighboring samples 322, 324, and 326 illustrated with reference to FIG. 3 are merely examples. Other sizes of the block, numbers of neighboring samples, and/or types of filters are within the contemplated embodiments of the present disclosure.

Figure 4:
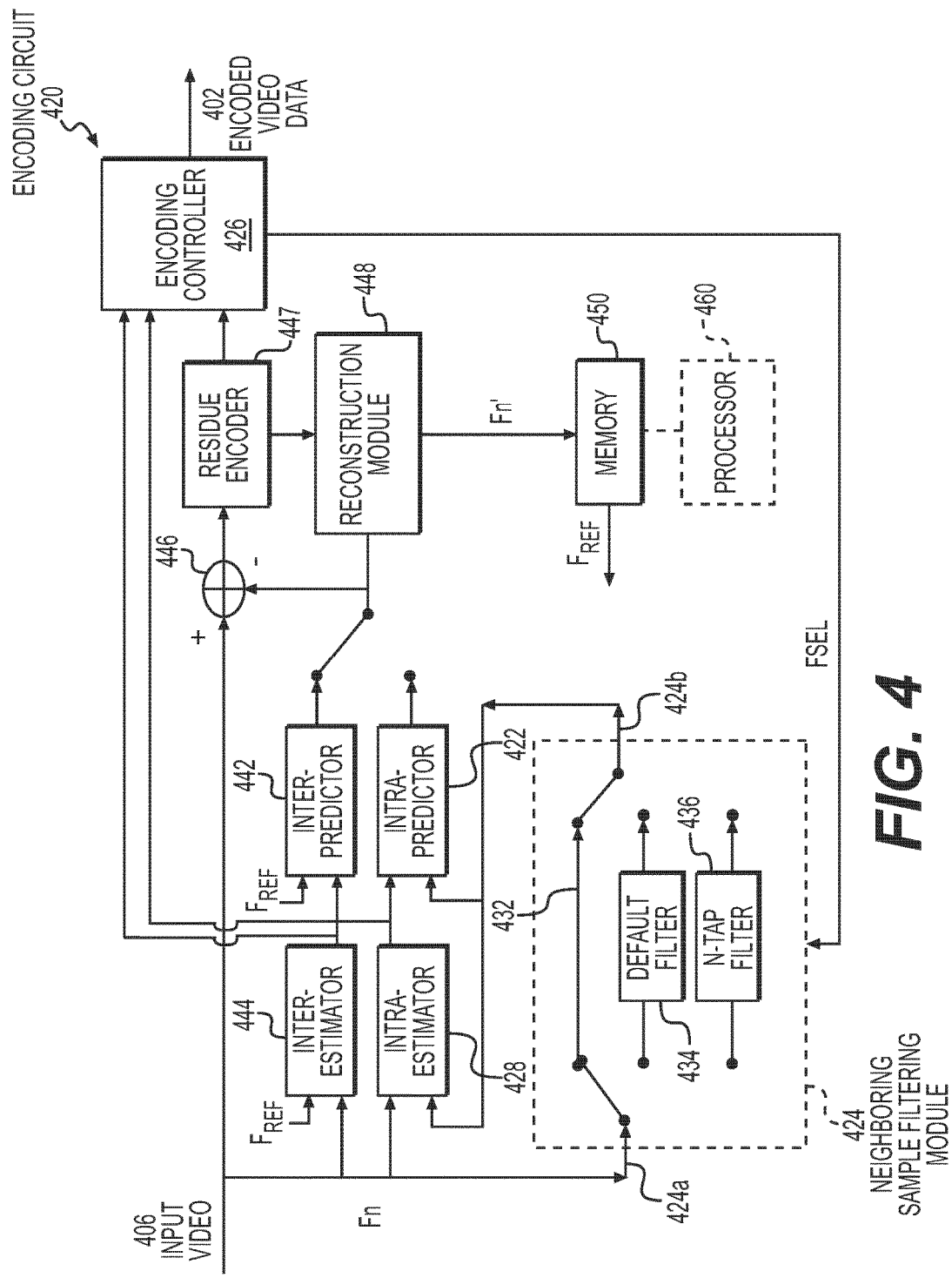
FIG. 4 shows a functional block diagram of an encoding circuit in the video coding system in FIG. 1 according to an embodiment of the disclosure.

FIG. 4 shows a functional block diagram of an encoding circuit 420 in the video coding system, such as the video coding system 100 in FIG. 1, according to an embodiment of the disclosure. FIG. 4 is a simplified illustration of the encoding circuit 420 and thus may not show all the details and variations of the encoding circuit 420.

The encoding circuit 420 includes an intra-predictor 422, an intra-estimator 428, a neighboring sample filtering module 424, and an encoding controller 426. The neighboring sample filtering module 424 includes at least a bypass path 432, a default filter 434, and an N-tap filter 436 that can be selectively coupled between an input terminal 424*a* and an output terminal 424*b* of the neighboring sample filtering module 424. The neighboring sample filtering module 424 may have a configuration similar to the neighboring sample filtering module 214 in FIG. 2, and detailed description thereof is thus omitted. In some examples, the neighboring sample filtering module 214 and the neighboring sample filtering module 424 may be implemented as a hardware component, a software component, or a combination thereof. Also, the neighboring sample filtering module 214 and the neighboring sample filtering module 424 may be implemented as an integrated module that is shared by the decoding circuit 110 and the encoding circuit 120 of the video coding system 100.

The encoding circuit 420 also includes an inter-predictor 442, an inter-estimator 444, an adder 446, a residue encoder 447, a reconstruction module 448, a memory 450, and a processor 460.

The encoding controller 426 supervises the operation of the intra-estimator 428 and the inter-estimator 444 and instructs the intra-estimator 428 or the inter-estimator 444 to divide each frame image into various blocks and to determine the prediction scheme, prediction mode, and/or corresponding coefficients for each block. The encoding controller 426 also generates the output video data 402 based on the input from the intra-estimator 428, the inter-estimator 444, and the residue encoder 447.

When the intra-estimator 428 is used to encode a block using intra-prediction, the intra-estimator 428 receives a current frame image Fn of the input video 406 and processed neighboring samples adjacent to the block from the neighboring samples filtering module 424 and determines one of a predetermined intra-prediction mode according to a video coding standard. The intra-estimator 428 then outputs the determined intra-prediction mode to the intra-predictor 422 and the encoding controller 426. The intra-predictor 422 generates a predicted image of the current block based on the processed neighboring samples and the determined intra-prediction mode in a manner similar to the operation of the intra-predictor 212 in FIG. 2.

When the inter-estimator 444 is used to encode a block using inter-prediction, the inter-estimator 444 receives the current frame image Fn and one or more reconstructed reference frame images $F_{REF}$ and determines encoding parameters and coefficients accordingly. The inter-estimator 444 then outputs the determined encoding parameters and coefficients to the inter-predictor 442 and the encoding controller 426. The inter-predictor 442 generates a predicted image of the current block based on the reference frame images and the determined encoding parameters and coefficients in a manner similar to the operation of the inter-predictor 242 in FIG. 2.

The adder 446 receives an original image of the current block and the predicted image of the block generated by the intra-predictor 422 or the inter-predictor 442, and outputs a residue image by subtracting the predicted image from the original image of the current block. The residue encoder 447 receives the residue image and encoded the residue image. The encoding controller 426 may generate the encoded video data 402 based on the output of the intra-estimator 428, the inter-estimator 444, and the residue encoder 447. In some examples, the encoding controller 426 may control the intra-estimator 428, inter-estimator 444, intra-predictor 422, inter-predictor 442, and/or the residue encoder 447 to encode same block based on different prediction schemes and parameters and select an optimal combination of encoding scheme and parameters for encoding the block.

The reconstruction module 448 may receive the predicted image from the intra-predictor 422 or the inter-predictor 442 and a reconstructed residue image form the residue encoder 447 and generates a reconstructed image Fn' of the frame image in a manner similar to the operation of the output filter 248 in FIG. 2. The reconstructed frame image Fn' is stored in the memory 450 and is accessible by the inter-estimator 444 as reference $F_{REF}$ according to a predetermined video coding standard.

In operation, when a block of a frame is to be encoded by intra-prediction, the intra-estimator 428 receives the original image of the block from the input video 406 and receives the processed neighboring samples adjacent to the block from the neighboring sample filtering module 424. The encoding controller 426 may set the neighboring sample filtering module 424 to use the bypass path 432, the default filter 434, or the N-tap filter 436 for processing the neighboring samples adjacent to the current block and configures the neighboring sample filtering module 424 accordingly via a filter selection signal (FSEL).

For example, the encoding controller 426 may determine the initial setting of the neighboring sample filtering module 424 based on a block size associated with the current block. After the encoding controller 426 receives the selected intra-prediction mode and the encoded residue image, the encoding controller 426 may determine whether to select a filter for performing a filtering process on the neighboring samples based on the intra-prediction mode and/or a block size associated with the current block. Also, the selection of a filter can be made according to the intra-prediction mode, a block size associated with the current block, or a number of non-zero coefficients associated with the current block. The encoding controller 426 may further instruct the intra-estimator 428 to analyze the image of the current block and update the selection of the intra-prediction mode and/or filter of the neighboring sample filtering module 424 accordingly. After the residue encoder 447 processed another residue image based on the update intra-prediction mode or filter selection, the encoding controller 426 can determine which encoding scheme to use and embedded such information in the final encoded video data 402. The process may repeat several times for a block until the encoding controller 426 determines that a proper encoding scheme and corresponding parameters or coefficients for encoding the current block has been found.

The encoding controller 426 may further determine whether to transmit a flag or an indicator embedded in the encoded video data 402 indicating whether the decoding process should use a filter and/or the selected filter for processing the neighboring samples adjacent to the current block. In some examples, the selection of the bypass path or the filter may be performed based on an intra-prediction mode and/or a block size associated with the current block, and the encoding controller 426 may not need to transmit the flag or the indicator, or even omit the determination for transmitting the flag or the indicator at all. For example, if the intra-prediction mode is the DC mode or the block size is 4×4 pixels, the image of the current block may be encoded based on the neighboring samples without being filtered by a filter of the neighboring sample filtering module 424. Also, if the intra-prediction mode is a vertical or horizontal directional intra-prediction mode, or a directional intra-prediction mode that is within a predetermined variation from the vertical or horizontal directional mode, the neighboring samples may also be bypassed without filtering.

The determination with respect to selecting a filter may be performed based on an intra-prediction mode and/or a block size associated with the current block. For example, the encoding controller 426 may determine which filter to use based on a number of non-zero coefficients associated with the current block. In some examples, if the number of non-zero coefficients is non-zero, the N-tap filter 436 may be selected to filter the neighboring samples for the next intra-prediction trial of the same block. In some examples, if the number of non-zero coefficients is greater than a predetermined number, the N-tap filter 436 may be selected to filter the neighboring samples. Otherwise, the default filter 432 may be selected.

Moreover, as shown in FIG. 4, the processor 460 is electrically coupled with the memory 450 and can be configured to execute program instructions stored in the memory 450 to perform various functions. The processor 460 can include a single or multiple processing cores.

Various components of the encoding circuit 420, such as the intra-predictor 422, intra-estimator 428, inter-predictor 442, inter-estimator 444, neighboring sample filtering module 424, encoding controller 426, residue encoder 447, adder 446, and reconstruction module 448, may be implemented by hardware components, the processor 460 executing the program instructions, or a combination thereof. Of course, the processor 460 can execute program instructions to control receiving of the encoded video data, the output or display of the output vide, and/or a function that is not directly related to the video encoding process of the input video 406.

The memory 450 can be used to store the program instructions, information corresponding to predetermined prediction modes, and/or intermediate data. In some examples, the memory 450 includes a non-transitory computer readable medium, such as a semiconductor or solid-state memory, a random access memory (RAM), a read-only memory (ROM), a hard disk, an optical disk, or other suitable storage medium. In some embodiments, the memory 250 includes a combination of two or more of the non-transitory computer readable mediums listed above.

As shown in FIGS. 2 and 4, the decoding circuit 210 and the encoding circuit 420 may be implemented in the same electronic device, and various components of the decoding circuit 210 and the encoding circuit 420 may be shared or reused. For example, one or more of the memory 250, processor 260, neighboring sample filtering module 214, intra-predictor 212, inter-predictor 242, and output filter 248 in the decoding circuit 210 may also be used to function as the memory 450, processor 460, neighboring sample filtering module 424, intra-predictor 422, inter-predictor 442, and reconstruction module 448 in FIG. 4, respectively.

Figure 5:
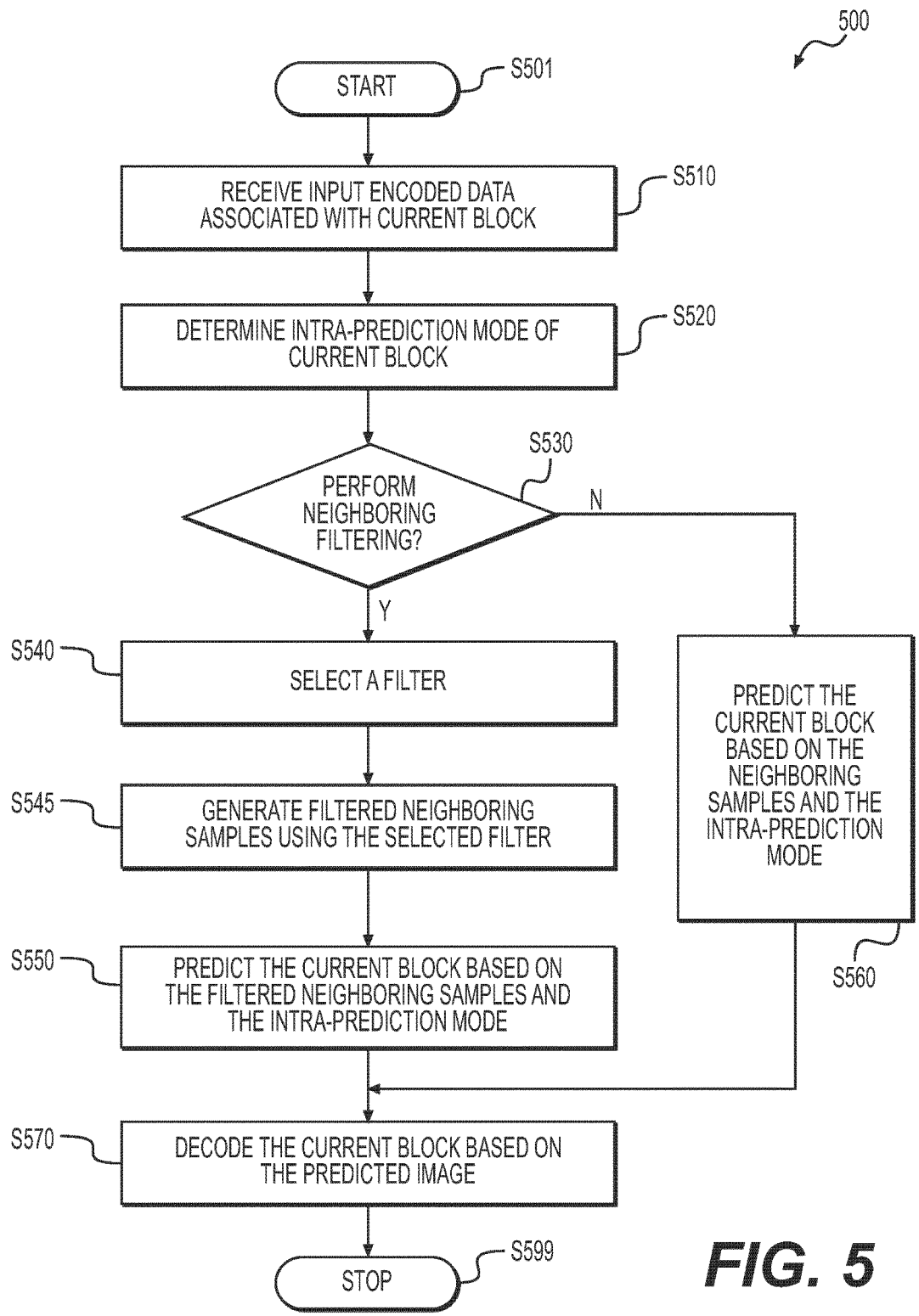
FIG. 5 shows a flow chart outlining a video decoding process using a decoding circuit, such as the decoding circuit in FIG. 2, according to an embodiment of the disclosure.

FIG. 5 shows a flow chart outlining a video decoding process using a decoding circuit, such as the decoding circuit 210 in FIG. 2, according to an embodiment of the disclosure. It is understood that additional operations may be performed before, during, and/or after the process 500 depicted in FIG. 5. The process 500 starts at S501 and proceeds to S510.

At S510, input encoded data associated with a current block in a current image frame of video data are received. The current block is coded by intra-prediction. The input encoded data may include prediction information that indicates an intra-prediction mode and residue information for generating a reconstructed image of the current block. For example, the decoding controller 216 may receive the encoded video data 202 that includes the input encoded data associated with the current block.

At S520, an intra-prediction mode of the current block is determined based on the prediction information in the input encoded data. In some examples, when the current block is a 4×4 luma block encoded based on the H.264 standard, the intra-prediction mode may be any one of 9 different intra-prediction modes consistent with the H.264 standard, including 8 different directional prediction modes and a DC prediction mode. When the current block is a 32×32 luma block encoded based on the H.265 standard, the intra-prediction mode may be any one of 35 different intra-prediction modes consistent with the H.265 standard, including 33 different directional prediction modes, a DC prediction mode, and a planar prediction mode. For example, the decoding controller 216 may determine intra-prediction mode of the current block based on the prediction information of the current block extracted from the encoded video data 202.

At S530, whether to perform a filtering process on neighboring samples adjacent to the current block is determined based on the intra-prediction mode and/or and a block size associated with the current block. If it is determined that a filtering process is to be performed on the neighboring samples, the process proceeds to S540. If it is determined that a filtering process is not to be performed on the neighboring samples, the process proceeds to S560.

In some examples, if the intra-prediction mode is the DC mode or the block size is 4×4 pixels, the filtering process may not be used. In some examples, if the intra-prediction mode is a directional intra-prediction mode that is a vertical or horizontal directional mode or is within a predetermined variation from the vertical or horizontal directional mode, the neighboring samples may also be bypassed without filtering. In some examples, whether to use a filter may be determined based on a filter enable flag or an explicit indication embedded in the encoded video data. For example, the decoding controller 216 may determine whether to perform a filtering process on the neighboring samples based on the information extracted from the encoded video data 202. The filter enable flag or the explicit indication can be transmitted at a sequence, view, picture, slice, or block level of a video stream that carries the video data (e.g., the encoded video data 202). In one example, the filter enable flag or the explicit indication can be included in SPS (Sequence Parameter Set), VPS (Video Parameter Set), APS (Adaptation Parameter Set), PPS (Picture Parameter Set), and the like.

At S540, one of a plurality of filters is selected for performing the filtering process on the neighboring samples adjacent to the current block. The one of a plurality of filters may include at least a default filter and an N-tap filter, where N is a positive integer different from 3. In some examples, the default filter is a 3-tap filter. In some examples, the filter to be used to perform the filtering process is selected based on deriving a filter selection flag that indicates whether the selected filter is the default filter or the N-tap filter. The filter selection flag may be explicitly provided by the input encoded data or implicitly provided based on information embedded in the input encoded data, such as the intra-prediction mode and/or a block size associated with the current block. In some examples, the filter selection flag is transmitted at a sequence, view, picture, slice, or block level of a video stream that carries the video data, or incorporated in SPS (Sequence Parameter Set), VPS (Video Parameter Set), APS (Adaptation Parameter Set), PPS (Picture Parameter Set), and the like. In some examples, the filter selection flag may be derived, or which filter to use may be determined, based on residue information associated with the current block. Of course, selecting the filter or deriving the filter selection flag may only be performed when a filtering process is to be performed. For example, deriving the filter selection flag may only be performed when the block size is greater than a threshold, which indicates that a filtering process on the neighboring samples is to be performed.

In some examples, when there is no filter selection flag explicitly provided by the input encoded data, the default filter is selected. In some examples, selecting the filter or deriving the flag may be performed based on the intra-prediction mode, the block size, or the residue information associated with the current block. For example, if a number of non-zero coefficients associated with the current block is non-zero, the N-tap filter may be selected. In some examples, if the number of non-zero coefficients is greater than a predetermined number that is greater than zero, the N-tap filter may be selected. Otherwise, the default filter may be selected. In some examples, the filter may be selected based on presence or absence of an explicit flag embedded in the encoded video data. For example, when the input encoded data do not include the filter selection flag that indicates the selection of the filter for filtering neighboring samples, the default filter may be selected.

In some examples, the decoding controller 216 may select the filter to be used to perform a filtering process on the neighboring samples of the current block.

At S545, filtered neighboring samples are generated by filtering the neighboring samples adjacent to the current block using the selected filter. For example the neighboring sample filtering module 214 is set based on a filter selection signal (FSEL) to select a filter (the default filter 234 or the N-tap filter 236) and filtering the neighboring samples from previously decoded blocks (or given values if the neighboring samples are unavailable).

At S550, the current block is predicted based on the filtered neighboring samples and the intra-prediction mode. For example, the intra-predictor 212 may generate a predicted image of the current block based on the intra-prediction mode determined by the decoding controller 216 and the filtered neighboring samples from the neighboring sample filtering module 214.

On the other hand, at S560, the neighboring samples will be used for predicting the current block without filtering. For example the neighboring sample filtering module 214 is set based on a filter selection signal (FSEL) to select a bypass path 232 such that the neighboring samples are forwarded to the intra-predictor 212 without being filtered by the filters of the neighboring sample filtering module 214. The intra-predictor 212 may generate a predicted image of the current block based on the intra-prediction mode determined by the decoding controller 216 and the neighboring samples that are not filtered by the neighboring sample filtering module 214.

At S570, the current block is decoded based on the predicted image from S550 or S560 and the residue information extracted from the input video data. For example, the predicted image generated by the intra-predictor 212 is combined with a residue image of the current block by the adder 246 to form a reconstructed image of the current block.

After S570, the process 500 proceeds to S599 and terminates. The process 500 may be performed repetitively to generate reconstructed images of other blocks of the received encoded video data. Moreover, the output filter 248 may further combine the reconstructed image of the current block as well as other reconstructed images of other blocks to form a raw frame image, and perform a de-blocking filtering process on the raw frame image to output a reconstructed frame image of output vide 204.

Figure 6:
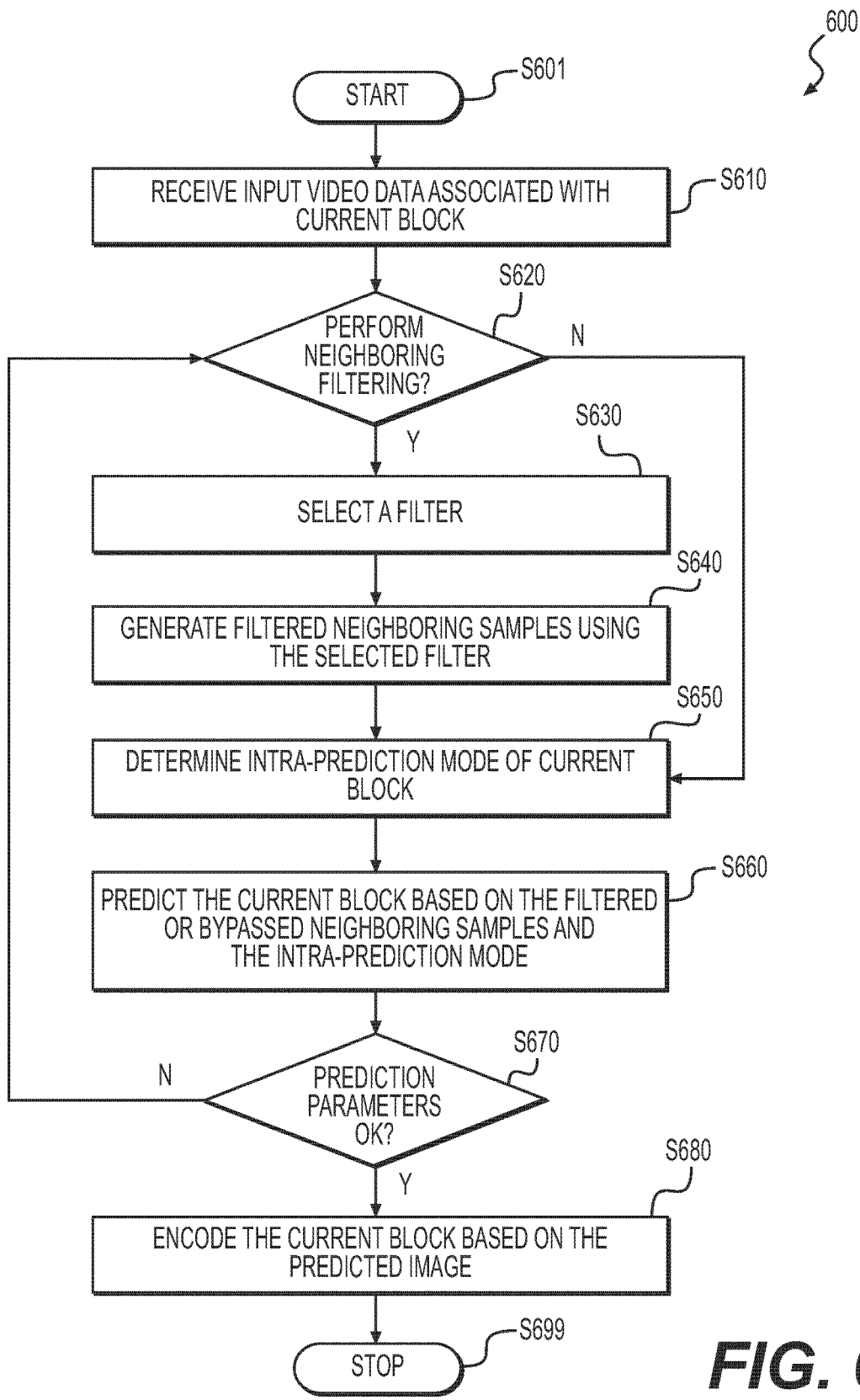
FIG. 6 shows a flow chart outlining a video encoding process using an encoding circuit, such as the encoding circuit in FIG. 4, according to an embodiment of the disclosure.

FIG. 6 shows a flow chart outlining a video encoding process 600 using an encoding circuit, such as the encoding circuit 420 in FIG. 4, according to an embodiment of the disclosure. It is understood that additional operations may be performed before, during, and/or after the process 600 depicted in FIG. 6. The process 600 starts at S601 and proceeds to S610.

At S610, input video data are received. The input video data may include at least a current block that is to be encoded by intra-prediction and neighboring samples adjacent to the current block. For example, the intra-estimator 428 and the adder 446 of the encoding circuit 420 may receive an original image of a current block in the input video 406. Also, the neighboring sample filtering module 424 may receive neighboring samples adjacent to the current block in the input video 406.

At S620, whether to perform a filtering process on neighboring samples adjacent to the current block is determined based on a default setting, a tentative intra-prediction mode, and/or and a block size associated with the current block. If it is determined that a filtering process is to be performed on the neighboring samples, the process proceeds to S630. If it is determined that a filtering process is not to be performed on the neighboring samples, the process proceeds to S650. For example, the encoding controller 426 may determine whether to perform a filtering process on the neighboring samples based on analyzing the original image of the current block and/or the prediction parameters determined during a previous prediction trial.

In some examples, if the tentative intra-prediction mode is the DC mode or the block size is 4×4 pixels, the filtering process may not be used. In some examples, if the tentative intra-prediction mode is a directional intra-prediction mode that is a vertical or horizontal directional mode or is within a predetermined variation from the vertical or horizontal directional mode, the neighboring samples may also be bypassed without filtering. Of course, if the tentative intra-prediction mode has not been determined yet, either a default filter or no filter may be used as a default setting. Once whether to use a filter is determined, such information may be transmitted to a decoding circuit by a flag (e.g., filter enable flag) or an explicit indication embedded in the resulting encoded video data. The filter enable flag or the explicit indication can be transmitted at a sequence, view, picture, slice, or block level of a video stream that carries the video data (e.g., the encoded video data 402). In one example, the filter enable flag or the explicit indication can be included in SPS (Sequence Parameter Set), VPS (Video Parameter Set), APS (Adaptation Parameter Set), PPS (Picture Parameter Set), and the like.

At S630, one of a plurality of filters is selected for performing the filtering process on the neighboring samples adjacent to the current block. The one of a plurality of filters may include at least a default filter and an N-tap filter, where N is a positive integer different from 3. In some examples, the default filter is a 3-tap filter. In some examples, the filter to be used to perform the filtering process is selected based on a default setting, the tentative intra-prediction mode, a block size associated with the current block, and/or the residue information associated with the current block from a previous prediction trial. For example, the encoding controller 426 may select the filter to be used to perform a filtering process on the neighboring samples of the current block.

At S640, filtered neighboring samples are generated by filtering the neighboring samples adjacent to the current block using the selected filter. For example the neighboring sample filtering module 424 is set based on a filter selection signal (FSEL) to select a filter (the default filter 434 or the N-tap filter 436) and filtering the neighboring samples from the frame image of the input video 406 (or given values if the neighboring samples are unavailable).

At S650, an intra-prediction mode of the current block is determined by analyzing the original image and the filtered or bypassed neighboring samples from the neighboring sample filtering module. In some examples, when the current block is a 4×4 luma block to be encoded based on the H.264 standard, the intra-prediction mode may be any one of 9 different intra-prediction modes consistent with the H.264 standard, including 8 different directional prediction modes and a DC prediction mode. When the current block is a 32×32 luma block to be encoded based on the H.265 standard, the intra-prediction mode may be any one of 35 different intra-prediction modes consistent with the H.265 standard, including 33 different directional prediction modes, a DC prediction mode, and a planar prediction mode. For example, the intra-estimator 428 may determine an intra-prediction mode that may minimize the overall encoding cost for encoding the current block.

At S660, the current block is predicted based on the filtered neighboring sample from S640/S650 or the bypassed neighboring samples from S620 and the intra-prediction mode determined at S650. The predicted image of the current block may be used to generate a residue image of the current block, which will be encoded as a part of the resulting encoded video data. For example, the intra-predictor 422 may generate a predicted image of the current block based on the intra-prediction mode determined by the intra-estimator 428 and the processed neighboring samples from the neighboring sample filtering module 424.

At S670, whether the prediction parameters, including the determined intra-prediction mode, whether to perform the filtering process on the neighboring samples, and/or which filter to use to perform the filtering process on the neighboring samples, are optimal or acceptable based on a predetermined video coding standard. When it is determined that the prediction parameters are acceptable, the process proceeds to S670. When it is determined to modify the prediction parameters, such as changing the intra-prediction mode, selecting to use or not to use a filter, and/or changing the selected filter, the process modifies the prediction parameters and proceeds to S620.

For example, the encoding controller 426 receives the determined intra-prediction mode from the intra-estimator 428 and the residue information from the residue encoder 447 and determines whether the current intra-prediction mode and the bypass/filter setting are acceptable. In some examples, the encoding controller 426 may update the setting of the neighboring sample filtering module 424 based on the intra-prediction mode and instruct the intra-estimator 428 to perform another prediction trial on the same block.

In some examples, the filter may be selected based the intra-prediction mode, a block size, and/or the residue information associated with the current block. For example, if a number of non-zero coefficients associated with the current block is non-zero, the N-tap filter may be selected for the next prediction trial. In some examples, if the number of non-zero coefficients is greater than a predetermined number that is greater than zero, the N-tap filter may be selected for the next prediction trial.

At S680, the current block is encoded based on the determined intra-prediction mode and the residue information that is generated based on the original image and the predicted image of the current block. For example, the encoding controller 426 may receive the determined intra-prediction mode from the intra-estimator 428 and the residue information from the residue encoder 447 and generate the encoded video data 402 accordingly.

Furthermore, the encoding controller 426 may determine whether to transmit a flag or an explicit indicator that can be embedded the encoded video data 402 in order to indicate whether to use a filter to process neighboring samples at all. In some example, the flag may be implicitly provided based on information embedded in the input encoded data, such as the intra-prediction mode, the residue information, and/or a block size associated with the current block. In some examples, the flag is transmitted at a sequence, view, picture, slice, or block level of a video stream that carries the video data.

Also, the encoding controller 426 may determine whether to transmit a flag (e.g., filter selection flag) or an explicit indicator that can be embedded the encoded video data 402 in order to indicate which filter of the neighboring sample filtering module 424 to use to process neighboring samples. In some examples, the filter selection flag is transmitted at a sequence, view, picture, slice, or block level of a video stream that carries the video data, or incorporated in SPS (Sequence Parameter Set), VPS (Video Parameter Set), APS (Adaptation Parameter Set), PPS (Picture Parameter Set), and the like. In some examples, when the default filter is selected, is no filter selection flag needs to be explicitly provided in the encoded video data. In some examples, providing an explicit filter selection flag may not be needed when selecting the filter is performed based on the intra-prediction mode, the block size, or the residue information associated with the current block. In some examples, the presence or absence of an explicit flag in the encoded video data can be used to indicate which filter is to be selected.

After S680, the process 600 proceeds to S699 and terminates. The process 600 may be performed repetitively to encode blocks of frame images of the input video.

In some embodiments, the bypass path 232 in the neighboring sample filtering module 214 and the bypass path 432 in the neighboring sample filtering module 424 may be incorporated in the default filter 234 and the default filter 434, respectively. At the decoding side, in one example, whether the default filter 234 or the N-tap filter 236 is selected for the current block is determined according to an explicit flag or an implicit flag. If the flag indicates that the N-tap filter 236 is not selected, either the bypass path 232 or a 3-tap filter with filter coefficients [1, 2, 1]/4 in the default filter 234 is used, based on the intra-prediction mode and/or the block size associated with the current block, for processing the neighboring samples adjacent to the current block. If the flag indicates that the N-tap filter 236 is selected, the N-tap filter 236 is unconditionally performed on the neighboring samples adjacent to the current block to generate the filtered neighboring samples. In one example, only when the block size (or a width of the current block, a height of the current block, a quadtree depth associated with the current block, a coding unit split depth associated with the current block, and a quadtree-binary tree split depth associated with the current block) is larger than a predefined threshold, the flag for indicating the selection of the default filter 234 or the N-tap filter 236 is incorporated in the encoded video data (e.g., the bit stream). In another example, only when the current block includes at least one non-zero coefficient, the number of the non-zero coefficients in current block is larger than a predefined threshold, or the sum of the magnitudes of the non-zero coefficients in the current block is larger than a predefined threshold, the flag for indicating the selection of the default filter 234 or the N-tap filter 236 is incorporated in the encoded video data. When the flag is not incorporated in the encoded video data, the bypass path 232 or the 3-tap filter with filter coefficients [1, 2, 1]/4 in the default filter 234 is adaptively applied based on the intra-prediction mode and/or the block size associated with the current block. The neighboring sample filtering module 424 may have a configuration similar to the neighboring sample filtering module 214, and detailed description thereof is thus omitted.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. A method for video coding, comprising:
receiving input data associated with a current block in a current image frame of video data, wherein the current block is coded by intra-prediction or to be coded by intra-prediction;
determining an intra-prediction mode of the current block;

determining whether adaptive neighboring samples filtering is enabled or not based on block size information associated with the current block;

in response to the adaptive neighboring samples filtering being enabled, selecting one of a first plurality of processes including at least a bypass process, a default filter process, and an N-tap filter process, where N is a positive integer different from 3;

in response to the adaptive neighboring samples filtering being not enabled, selecting one of a second plurality of process including the bypass path process and the default filter process;

processing original neighboring samples adjacent to the current block using the selected process, including:
when the default filter process or the N-tap filter process is selected, generating filtered neighboring samples by filtering the original neighboring samples adjacent to the current block using the selected process, and regarding the filtered neighboring samples as the processed neighboring samples; and
when the bypass path process is selected, regarding the original neighboring samples as the processed neighboring samples; and encoding or decoding the current block by predicting the current block based on the processed neighboring samples and the intra-prediction mode.

2. The method of claim 1, further comprising transmitting or deriving a flag that indicates whether the selected process is the default filter process or the N-tap filter process.

3. The method of claim 2, further comprising:
transmitting or deriving the flag only when the adaptive neighboring samples filtering is enabled.

4. The method of claim 2, further comprising:
determining whether to transmit or derive the flag based on at least one of the intra-prediction mode and the block size information associated with the current block; and
when determined not to transmit or derive the flag, selecting the default filter process as the selected process.

5. The method of claim 4, wherein
the block size information associated with the current block comprises one or a combination of a width of the current block, a height of the current block, a quadtree depth associated with the current block, a coding unit split depth associated with the current block, and a quadtree-binary tree split depth associated with the current block, and
the method further comprises transmitting or deriving the flag only when the width or the length of the current block is greater than a first predefined threshold.

6. The method of claim 2, further comprising:
determining whether to transmit or derive the flag based on residual coding of the current block; and
when determined not to transmit or derive the flag, selecting the default filter process as the selected process.

7. The method of claim 6, wherein the flag is transmitted or derived only when at least one non-zero coefficient associated with the current block.

8. The method of claim 6, wherein the flag is transmitted or derived only when a number of non-zero coefficients associated with the current block is greater than a second predefined threshold.

9. The method of claim 6, wherein the flag is transmitted or derived only when a statistic value of magnitudes of non-zero coefficients associated with the current block is greater than a third predefined threshold.

10. The method of claim 2, wherein the flag is transmitted at a sequence, view, picture, slice, or block level of a video stream that carries the video data.

11. A video coding apparatus, comprising:
a processing circuit configured to:
receive input data associated with a current block in a current picture of video data, wherein the current block is coded by intra-prediction or to be coded by intra-prediction;
determine an intra-prediction mode of the current block;
determine whether adaptive neighboring samples filtering is enabled or not based on block size information associated with the current block;
in response to the adaptive neighboring samples filtering being enabled, select one of a first plurality of processes including at least a bypass process, a default filter process, and an N-tap filter process, where N is a positive integer different from 3;
in response to the adaptive neighboring samples filtering being not enabled, select one of a second plurality of process including the bypass path process and the default filter process;
processing original neighboring samples adjacent to the current block using the selected process, including:
when the default filter process or the N-tap filter process is selected, generate filtered neighboring samples by filtering the original neighboring samples adjacent to the current block using the selected process, and regard the filtered neighboring samples as the processed neighboring samples; and
when the bypass path process is selected, regard the original neighboring samples as the processed neighboring samples; and
encode or decode the current block by predicting the current block based on the processed neighboring samples and the intra-prediction mode.

12. The apparatus of claim 11, wherein the processing circuit is further configured to transmit or derive a flag that indicates whether the selected process is the default filter process or the N-tap filter process.

13. The apparatus of claim 12, wherein the processing circuit is further configured to:
transmit or derive the flag only when the adaptive neighboring samples filtering is enabled.

14. The apparatus of claim 12, wherein the processing circuit is further configured to:
determine whether to transmit or derive the flag based on at least one of the intra-prediction mode and the block size information associated with the current block; and
when determined not to transmit or derive the flag, select the default filter process as the selected filter process.

15. The apparatus of claim 14, wherein
the block size information associated with the current block comprises one or a combination of a width of the current block, a height of the current block, a quadtree depth associated with the current block, a coding unit split depth associated with the current block, and a quadtree-binary tree split depth associated with the current block, and
the processing circuit is further configured to transmit or deriving the flag only when the width or the length of the current block is greater than a first predefined threshold.

16. The apparatus of claim 12, wherein the processing circuit is further configured to:
- determine whether to transmit or derive the flag based on residual coding of the current block; and
- when determined not to transmit or derive the flag, select the default filter process as the selected process.

17. The apparatus of claim 16, wherein the flag is transmitted or derived only when a number of non-zero coefficients associated with the current block is greater than a second predefined threshold.

18. The apparatus of claim 16, wherein the flag is transmitted or derived only when a statistic value of magnitudes of non-zero coefficients associated with the current block is greater than a third predefined threshold.

19. A non-transitory computer readable medium storing program instructions for causing a processing circuit of an apparatus to perform a video coding method, and the method comprising:
- receiving input data associated with a current block in a current picture of video data, wherein the current block is coded by intra-prediction or to be coded by intra-prediction;
- determining an intra-prediction mode of the current block;
- determining whether adaptive neighboring samples filtering is enabled or not based on block size information associated with the current block;
- in response to the adaptive neighboring samples filtering being enabled, selecting one of a first plurality of processes including at least a bypass process, a default filter process, and an N-tap filter process, where N is a positive integer different from 3;
- in response to the adaptive neighboring samples filtering being not enabled, selecting one of a second plurality of process including the bypass path process and the default filter process;
- processing original neighboring samples adjacent to the current block using the selected process, including:
  - when the default filter process or the N-tap filter process is selected, generating filtered neighboring samples by filtering the original neighboring samples adjacent to the current block using the selected process, and regarding the filtered neighboring samples as the processed neighboring samples; and
  - when the bypass path process is selected, regarding the original neighboring samples as the processed neighboring samples; and
- encoding or decoding the current block by predicting the current block based on the processed neighboring samples and the intra-prediction mode.

20. The non-transitory computer readable medium of claim 19, wherein the method further comprises transmitting or deriving a flag that indicates whether the selected process is the default filter process or the N-tap filter process.

21. The non-transitory computer readable medium of claim 20, wherein the method further comprises:
- transmitting or deriving the flag only when the adaptive neighboring samples filtering is enabled.

* * * * *